(12) United States Patent
Carlson et al.

(10) Patent No.: US 10,808,772 B2
(45) Date of Patent: Oct. 20, 2020

(54) HYDRAULIC CLUTCH SYSTEM FOR AUTOMATIC EMERGENCY BRAKING AND REMOTE STARTING OF MANUAL TRANSMISSION VEHICLES

(71) Applicant: GM GLOBAL TECHNOLOGY OPERATIONS LLC, Detroit, MI (US)

(72) Inventors: Eric Carlson, Linden, MI (US); David Howe, Pinckney, MI (US); William L. Cousins, Ortonville, MI (US); David A. Craig, Owasso, OK (US); Alex Kwon, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 16/154,531

(22) Filed: Oct. 8, 2018

(65) Prior Publication Data

US 2020/0109748 A1   Apr. 9, 2020

(51) Int. Cl.

| | |
|---|---|
| *F16D 25/08* | (2006.01) |
| *F16D 48/06* | (2006.01) |
| *B60W 30/09* | (2012.01) |
| *F02N 11/08* | (2006.01) |
| B60R 25/20 | (2013.01) |
| B60W 10/10 | (2012.01) |
| F02N 11/10 | (2006.01) |
| B60W 10/02 | (2006.01) |

(52) U.S. Cl.
CPC ........ *F16D 25/083* (2013.01); *F02N 11/0807* (2013.01); *F16D 48/066* (2013.01); *B60R 25/209* (2013.01); *B60W 10/02* (2013.01); *B60W 10/10* (2013.01); *B60W 30/09* (2013.01); *F02N 11/103* (2013.01); *F16D 25/087* (2013.01)

(58) Field of Classification Search
CPC ............................................. F16D 2500/50203
See application file for complete search history.

(56) References Cited

U.S. PATENT DOCUMENTS

| | | | | |
|---|---|---|---|---|
| 5,002,166 A | * | 3/1991 | Leigh-Monstevens | ..................... B60W 10/02 192/3.58 |
| 5,135,091 A | * | 8/1992 | Albers | .................... F16D 48/04 192/83 |
| 6,218,743 B1 | * | 4/2001 | Hayashi | ................ F02N 11/103 200/61.28 |
| 9,151,347 B1 | * | 10/2015 | Shaw | .................... F16D 48/066 |
| 2017/0089413 A1 | * | 3/2017 | Schwekutsch | .......... F16D 48/02 |
| 2017/0361838 A1 | * | 12/2017 | Maguire | ............... B60W 10/18 |

* cited by examiner

*Primary Examiner* — Mark A Manley

(57) ABSTRACT

A hydraulic clutch system that enables automatic emergency braking (AEB) and remote start of a manual transmission vehicle. The hydraulic clutch system includes a piston-operated hydraulic cylinder or other accumulator to store a charge of hydraulic fluid that can be selectively routed to the clutch and discharged under electronic control to thereby disengage the clutch independently of any operator input via the clutch pedal. By doing so, the system can provide an improved AEB response that slows or stops the vehicle without stalling the engine. The system may also be used to provide remote start capability to the vehicle by automatically disengaging the clutch as part of a remote start sequence of operations.

17 Claims, 4 Drawing Sheets

Figure 5

Figure 6

HYDRAULIC CLUTCH SYSTEM FOR AUTOMATIC EMERGENCY BRAKING AND REMOTE STARTING OF MANUAL TRANSMISSION VEHICLES

INTRODUCTION

The present invention relates to hydraulic clutch systems used in manual transmission passenger automobiles.

Many manual transmission passenger vehicles utilize a hydraulic clutch system that is operated by the driver via a clutch pedal which the driver depresses to disengage the clutch. Although newer manual clutch operation technologies are available, such as electronic clutch systems, the use of hydraulic based systems is still common and desirable for certain automotive transmission implementations.

Automatic emergency braking (AEB) is a newer technology using obstacle detection sensor systems that detect possible collision situations and automatically apply braking or other deceleration without driver input. For a manual transmission vehicle, this often results in stalling of the vehicle which may be in a higher drive gear than is usable for the speed to which the vehicle is reduced by the AEB system.

Remote vehicle starting is also a newer technology using wireless communication with the vehicle to enable a user of the vehicle to start the engine and/or other vehicle systems remotely, and is used principally to adjust the cabin temperatures to a comfortable level prior to arrival at the vehicle by the occupant, as well as to help clear snow, ice, etc. from the vehicle in inclement weather. Remote start of the engine is typically not available for a vehicle that is left parked in gear.

SUMMARY

According to one aspect of the invention, there is provided a hydraulic clutch system having electronically-actuated automatic clutch disengagement for use in a manual transmission vehicle. The hydraulic clutch system includes:
- a hydraulic cylinder having a supply of hydraulic fluid therein;
- a clutch pedal operatively connected to the hydraulic cylinder so as to force at least some of the hydraulic fluid out of the hydraulic cylinder and thereby pressurize the hydraulic fluid when the clutch pedal is depressed;
- an accumulator storing a charge of the hydraulic fluid and operable to force at least some of the hydraulic fluid out of the accumulator and thereby pressurize the hydraulic fluid;
- a clutch that, when engaged, couples an engine of the vehicle to a transmission of the vehicle, wherein the clutch disengages the engine from the transmission in response to receiving the pressurized hydraulic fluid from either the hydraulic cylinder or the accumulator, thereby preventing motive power from the engine to be transferred to the transmission;
- an actuator having at least a first position and a second position corresponding to respective first and second modes of operation of the hydraulic clutch system; and
- a controller electrically connected to the actuator to switch the actuator from the first position to the second position;
- wherein, when the actuator is in the first position, the hydraulic clutch system is operable in a first mode in which the clutch may be operated by a driver of the manual transmission vehicle using the clutch pedal, and when the actuator is in the second position, the hydraulic clutch system is operable in a second mode in which the clutch is disengaged by the pressurized hydraulic fluid from the accumulator independently of any driver input to the clutch pedal.

According to various embodiments, the hydraulic clutch system may further include any one of the following features or any technically-feasible combination of some or all of these features:
- the actuator switches from the first position to the second position in response to a clutch activation signal received by the actuator from the controller so as to cause the hydraulic clutch system to switch to the second mode in which the clutch is disengaged by the pressurized hydraulic fluid from the accumulator, and wherein the controller is operable, in response to receiving a clutch disengagement command, to generate the clutch activation signal when at least the following two conditions exist: the clutch is engaged and the accumulator is charged;
- the clutch disengagement command is received as part of an automatic emergency braking event and wherein, following generation of the clutch activation signal and disengagement of the clutch by the pressurized hydraulic fluid from the accumulator, the controller operates to switch the hydraulic clutch system out of the second mode and into one or more subsequent modes that permit recharging of the accumulator and operation of the clutch by the driver using the clutch pedal;
- the clutch disengagement command is received as part of a remote start event that involves, prior to receipt of the clutch disengagement command, an electronically-controlled setting or setting confirmation of a vehicle brake, and that involves, after generation of the clutch activation signal and disengagement of the clutch by the pressurized hydraulic fluid from the accumulator, starting the engine and operating the controller to switch the hydraulic clutch system out of the second mode and into one or more subsequent modes that permit recharging of the accumulator and operation of the clutch by the driver using the clutch pedal;
- the actuator comprises a solenoid valve interconnected between the hydraulic cylinder, accumulator, and clutch so as to selectively route the hydraulic fluid among the hydraulic cylinder, accumulator, and clutch, and wherein the solenoid valve has a plunger that moves between different positions within the solenoid valve, the solenoid valve further comprising at least one solenoid that, when energized, causes the plunger to move between at least two of the positions so as to switch the hydraulic clutch system between the first and second modes of operation;
- the solenoid valve includes a plurality of input ports, at least one of each of which is connected to the hydraulic cylinder, accumulator, and clutch so as to provide fluidic communication of the hydraulic fluid between the solenoid valve and the hydraulic cylinder, accumulator, and clutch, and wherein the plunger includes one or more passageways that selectively connect different combinations of the ports together depending on at which of the at least two positions the plunger is located;
- the system further comprises a third mode of operation, wherein, when the hydraulic clutch system is in the first mode, the plunger is at a first one of the positions in which the hydraulic cylinder is in fluidic communication with the clutch, when the hydraulic clutch system is in the second mode, the plunger is at a second one of the positions in which the accumulator is in fluidic communication with the clutch, and when the hydraulic clutch system is in the third mode, the plunger is at a third one of the positions in which the hydraulic cylinder is in fluidic communication with the accumulator such that the accumulator can be recharged with pressurized hydraulic fluid by the driver depressing the clutch pedal;

the actuator comprises a housing having a solenoid and plunger that moves between the first and second positions, wherein the first position corresponds to an extended position in which the plunger protrudes from the housing, and the second position corresponds to a retracted position in which the plunger is retracted at least partially into the housing, wherein the plunger is biased into the first position and moves from the first position to the second position in response to energization of the solenoid;

the accumulator comprises a second hydraulic cylinder having a piston that moves between positions adjacent first and second ends of the second hydraulic cylinder, wherein the piston is biased towards the second end, and wherein the plunger is disposed between the first and second ends at a location that, when in its extended position, interferes with movement of the piston towards the second end such that the accumulator holds the charge of hydraulic fluid when the plunger is in the extended position and discharges the charge of hydraulic fluid out of the accumulator when the plunger is moved to the retracted position by energization of the solenoid to thereby free the piston to move towards the second end under force of the bias on the piston.

According to another aspect of the invention, there is provided a hydraulic clutch system having electronically-actuated automatic clutch disengagement for use in a manual transmission vehicle. The hydraulic clutch system includes:

a hydraulic cylinder having a supply of hydraulic fluid therein;

a clutch pedal operatively connected to the hydraulic cylinder so as to force at least some of the hydraulic fluid out of the hydraulic cylinder and thereby pressurize the hydraulic fluid when the clutch pedal is depressed;

an accumulator storing a charge of the hydraulic fluid and having a piston biased so as to force at least some of the hydraulic fluid out of the accumulator and thereby pressurize the hydraulic fluid;

a clutch that couples an engine of the vehicle to a transmission of the vehicle and that disengages the engine from the transmission in response to receiving the pressurized hydraulic fluid from either the hydraulic cylinder or the accumulator;

a distribution valve interconnected between the hydraulic cylinder, accumulator, and clutch so as to selectively route the hydraulic fluid among the hydraulic cylinder, accumulator, and clutch;

wherein the distribution valve is electronically operated to switch between a first state in which the hydraulic cylinder is in fluidic communication with the clutch, a second state in which the accumulator is in fluidic communication with the clutch, and a third state in which the hydraulic cylinder is in fluidic communication with the accumulator;

wherein, when the distribution valve is in the first state, the hydraulic clutch system is operable in a first mode in which the clutch may be operated by a driver of the manual transmission vehicle using the clutch pedal, and when the distribution valve is in the second state, the hydraulic clutch system is operable in a second mode in which the clutch is disengaged by the pressurized hydraulic fluid from the accumulator independently of any driver input to the clutch pedal, and when the distribution valve is in the third state, the hydraulic clutch system is operable in a third mode in which depressing the clutch pedal by the driver recharges the accumulator with pressurized hydraulic fluid.

According to various embodiments, the hydraulic clutch system of the preceding paragraph may further include any one of the following features or any technically-feasible combination of some or all of these features:

the distribution valve comprises a solenoid valve that includes a plurality of input ports, at least one of each of which is connected to the hydraulic cylinder, accumulator, and clutch so as to provide fluidic communication of the hydraulic fluid between the solenoid valve and hydraulic cylinder, accumulator, and clutch, and wherein the solenoid valve has a plunger that moves linearly within the solenoid valve between first, second, and third positions corresponding to the respective first, second, and third states, the plunger including one or more passageways that selectively connect different combinations of the ports together depending on whether the plunger is located at the first, second, or third position, and, optionally, wherein the first position is located between the second and third positions and wherein the plunger is biased into the first position the solenoid valve has two of the ports connected to the accumulator, with one port directly connected to the accumulator so as to receive pressurized hydraulic fluid to disengage the clutch when the solenoid valve is in the second state, and the other port connected to the accumulator via a check valve that opens when the accumulator is recharged while the solenoid valve is in the third state and that prevents backflow of hydraulic fluid through the check valve from the accumulator;

the hydraulic clutch system further comprises a controller, wherein the distribution valve switches from the first position to the second position in response to a clutch activation signal received by the distribution valve from the controller so as to cause the hydraulic clutch system to switch to the second mode in which the clutch is disengaged by the pressurized hydraulic fluid from the accumulator, and wherein the controller is operable, in response to receiving a clutch disengagement command, to generate the clutch activation signal when at least the following two conditions exist: the clutch is engaged and the accumulator is charged;

the distribution valve switches from the second position to the third position in response to an accumulator recharge signal received by the distribution valve from the controller so as to cause the hydraulic clutch system to switch to the third mode in which the accumulator is recharged with the pressurized hydraulic fluid provided by the hydraulic cylinder in response to the driver depressing the clutch pedal;

the clutch disengagement command is received as part of an automatic emergency braking event and wherein, following generation of the clutch activation signal and disengagement of the clutch by the pressurized hydraulic fluid from the accumulator, the controller operates to switch the hydraulic clutch system out of the second mode and into the third mode so as to permit recharging of the accumulator and operation of the clutch by the driver using the clutch pedal;

the clutch disengagement command is received as part of a remote start event that involves, prior to receipt of the clutch disengagement command, an electronically-controlled setting or setting confirmation of a vehicle brake, and that involves, after generation of the clutch activation signal and disengagement of the clutch by the pressurized hydraulic fluid from the accumulator, starting the engine and operating the controller to switch the hydraulic clutch system out of the second mode and into the third mode so as to permit recharging of the accumulator and operation of the clutch by the driver using the clutch pedal.

According to another aspect of the invention, there is provided a method of automatic clutch disengagement for use in a manual transmission vehicle, wherein the method is carried out by a vehicle having an engine, a manual transmission, and a hydraulic clutch system that includes a clutch connected between the engine and the transmission and a clutch pedal that can be manually depressed by a vehicle driver to disengage the clutch. The method includes:

receiving a clutch disengagement command at a clutch system controller;

determining, based on one or more hydraulic clutch system state indicators, that the hydraulic clutch system is in a proper state for clutch disengagement;

disengaging the clutch independently of any driver input on the clutch pedal.

According to various embodiments, the method of the preceding paragraph may further include any one of the following features or any technically-feasible combination of some or all of these features:

the disengaging step further comprises disengaging the clutch using pressurized hydraulic fluid supplied by an accumulator of the hydraulic clutch system, and wherein the method provides automatic emergency braking that includes, prior to the receiving step, detecting an event that requires the vehicle to reduce speed, and wherein the method further comprises, after the disengaging step, causing or allowing the vehicle to slow, and recharging the accumulator with hydraulic fluid pressurized by the driver using the clutch pedal;

the disengaging step further comprises disengaging the clutch using pressurized hydraulic fluid supplied by an accumulator of the hydraulic clutch system, and wherein the method provides remote staring of the vehicle that includes, prior to the receiving step, receiving a remote start command and setting or confirming setting of an electronic brake on the vehicle, and wherein the method further comprises, after the disengaging step, starting the engine and thereafter recharging the accumulator with hydraulic fluid pressurized by the driver using the clutch pedal.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Described below and shown in the accompanying drawings are embodiments of a hydraulic clutch system that enables automatic emergency braking (AEB) and remote start of a manual transmission vehicle. Such manual transmissions typically require operator pedal input to selectively disengage the clutch that transmits motive power from the vehicle engine to the transmission. The hydraulic clutch system described below includes a piston-operated hydraulic cylinder or other accumulator to store a charge of hydraulic fluid that can be selectively routed to the clutch and discharged under electronic control to thereby disengage the clutch independently of any operator input via the clutch pedal. By doing so, the system can provide an improved AEB response that slows or stops the vehicle without stalling the engine. The system may also be used to provide remote start capability to the vehicle by automatically disengaging the clutch as part of a remote start sequence of operations.

Figure 1:
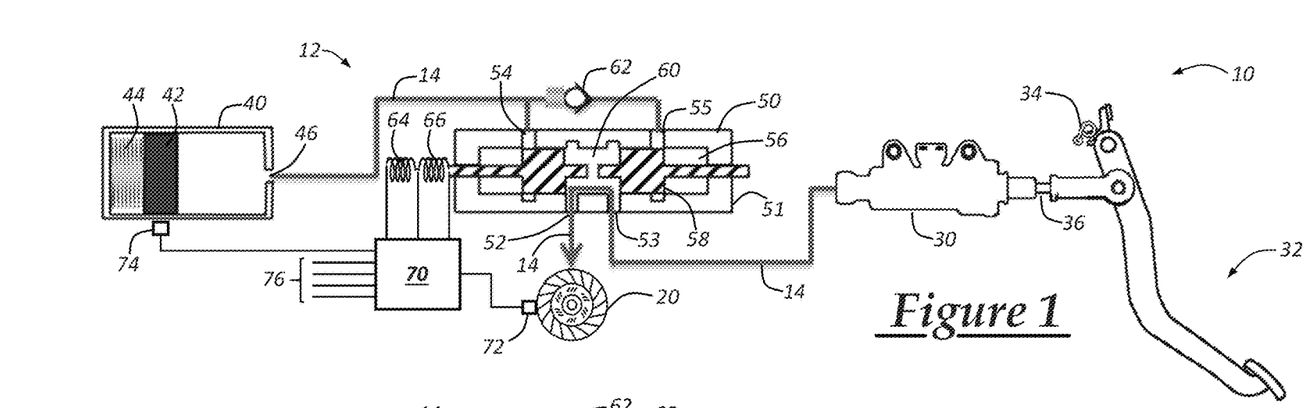
FIG. 1 is a diagrammatic view of a hydraulic clutch system according to an embodiment of the invention operating in a first mode.
Figure 2:
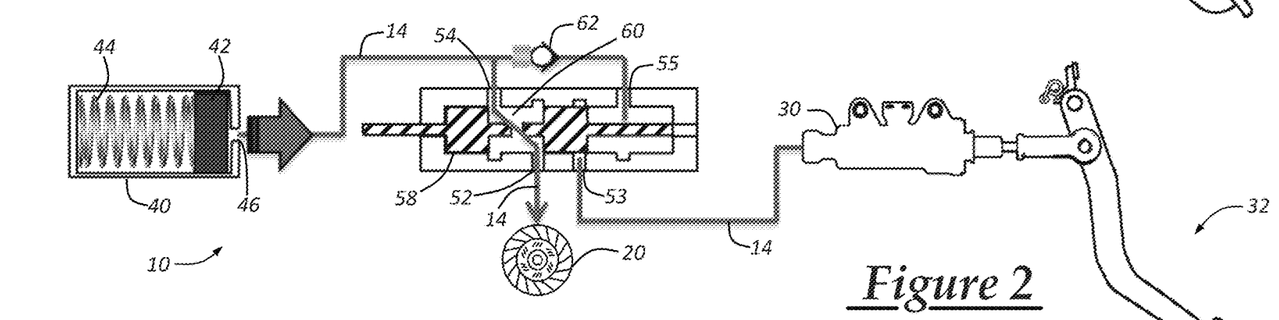
FIG. 2 is a diagrammatic view of portions of the hydraulic clutch system of FIG. 1 operating in a second mode.
Figure 3:
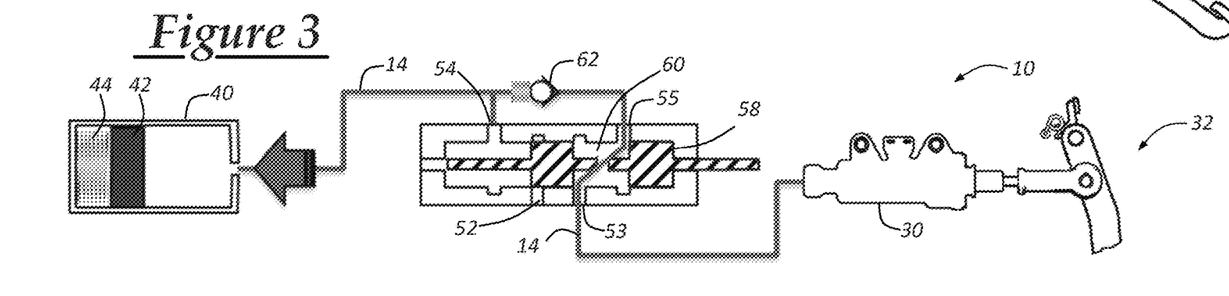
FIG. 3 is a diagrammatic view of portions of the hydraulic clutch system of FIG. 1 operating in a third mode.

Referring to FIGS. 1-3, there is shown three modes of operation of a hydraulic clutch system 10 that is incorporated into a vehicle having an engine providing motive output to a manually-shiftable transmission via a clutch. The hydraulic clutch system 10 features electronically-actuated automatic clutch disengagement of the manual transmission, and this feature may be advantageously used for implementing AEB and remote starting of the vehicle using integrated electronics on the vehicle. Those electronics, as well as the engine, transmission, and other components of the vehicle not shown may be implemented using conventional vehicle components and systems.

The hydraulic clutch system 10 includes as major components a clutch 20, a hydraulic cylinder 30, and an accumulator 40, all interconnected by a distribution valve 50 to thereby form a reconfigurable hydraulic circuit 12. These components of hydraulic clutch system 10 are interconnected by hydraulic lines or pipes 14, with the hydraulic circuit being reconfigurable to change interconnections of the components using distribution valve 50. A controller 70 is electrically connected to the distribution valve 50 to switch it between the different interconnections that provide three different modes of operation: a first (normal) mode in which the clutch 20 may be operated by the driver using the hydraulic cylinder 30 (by way of a clutch pedal); a second (automatic clutch deployment) mode in which the clutch 20 is disengaged by a charge of hydraulic fluid fired from the accumulator 40; and a third (recharge) mode in which the driver can recharge the accumulator 40 for a subsequent automatic clutch disengagement by a clutch pedal press that forces a new charge of hydraulic fluid into the accumulator 40. And, as will be apparent from the description below, the distribution valve 50 reconfigures the hydraulic circuit 12 (and thus the hydraulic clutch system 10, itself) into the different modes by selectively interconnecting two of the components 20, 30, 40 together while isolating the third, thereby effectively removing the third component from the hydraulic circuit 12.

The clutch 20, when engaged, couples the vehicle engine to the transmission of the vehicle. The clutch 20 can be disengaged in response to receiving pressurized hydraulic fluid from either the hydraulic cylinder 30 or the accumulator 40, thereby preventing motive power from the engine to be transferred to the transmission. The clutch 20 may be implemented conventionally and may include a slave cylinder for transmitting the hydraulic pressure received from the hydraulic cylinder 30 or the accumulator 40 into a release lever for the clutch 20. The slave cylinder and release lever may be implemented conventionally and are thus not shown. Similarly, other required and/or optional components of hydraulic clutch system 10 that are not shown may be implemented conventionally, and their construction, integration, and use will be known to those skilled in the art.

Hydraulic cylinder 30 is a master cylinder containing a supply of hydraulic fluid. It is operatively connected to a clutch pedal 32 that is mounted for rotation with a return spring 34 to bias it towards a driver seat of the vehicle. Depressing the clutch pedal 32 by the operator's foot drives a push rod 36 into the hydraulic cylinder 30 to thereby pressurize and force hydraulic fluid from the cylinder 30 into the hydraulic circuit 12. When the hydraulic clutch system 10 is operating in a first (normal) mode, this pressurized hydraulic fluid is routed by the distribution valve 50 to the clutch 20 to thereby disengage the clutch.

Accumulator 40 is a hydraulic cylinder that stores a charge of the hydraulic fluid under pressure such that it is able to supply the pressurized hydraulic fluid to the clutch 20 when the distribution valve 50 is switched to the second (clutch deploy) mode. The accumulator 40 is a passive device that includes a piston 42 and a spring 44 positioned within the cylinder. The spring 44 is located at a first end of the cylinder and biases the piston 42 towards a second end having a port 46 connected to the hydraulic line 14 that runs to the distribution valve 50. The spring 44 has a spring constant that is greater than that used by the clutch 20 so that, upon firing of the accumulator 40, the spring 44 creates sufficient pressure in the hydraulic system 12 to disengage the clutch 20. Under the first (normal) mode of operation, the hydraulic lines 14 from the accumulator are isolated and blocked from the rest of the hydraulic circuit 12, such that the charge of hydraulic fluid within the accumulator can remain under pressure as indicated in FIG. 1. The operation of the accumulator in the second (deploy) mode is described further below.

Figure 6:
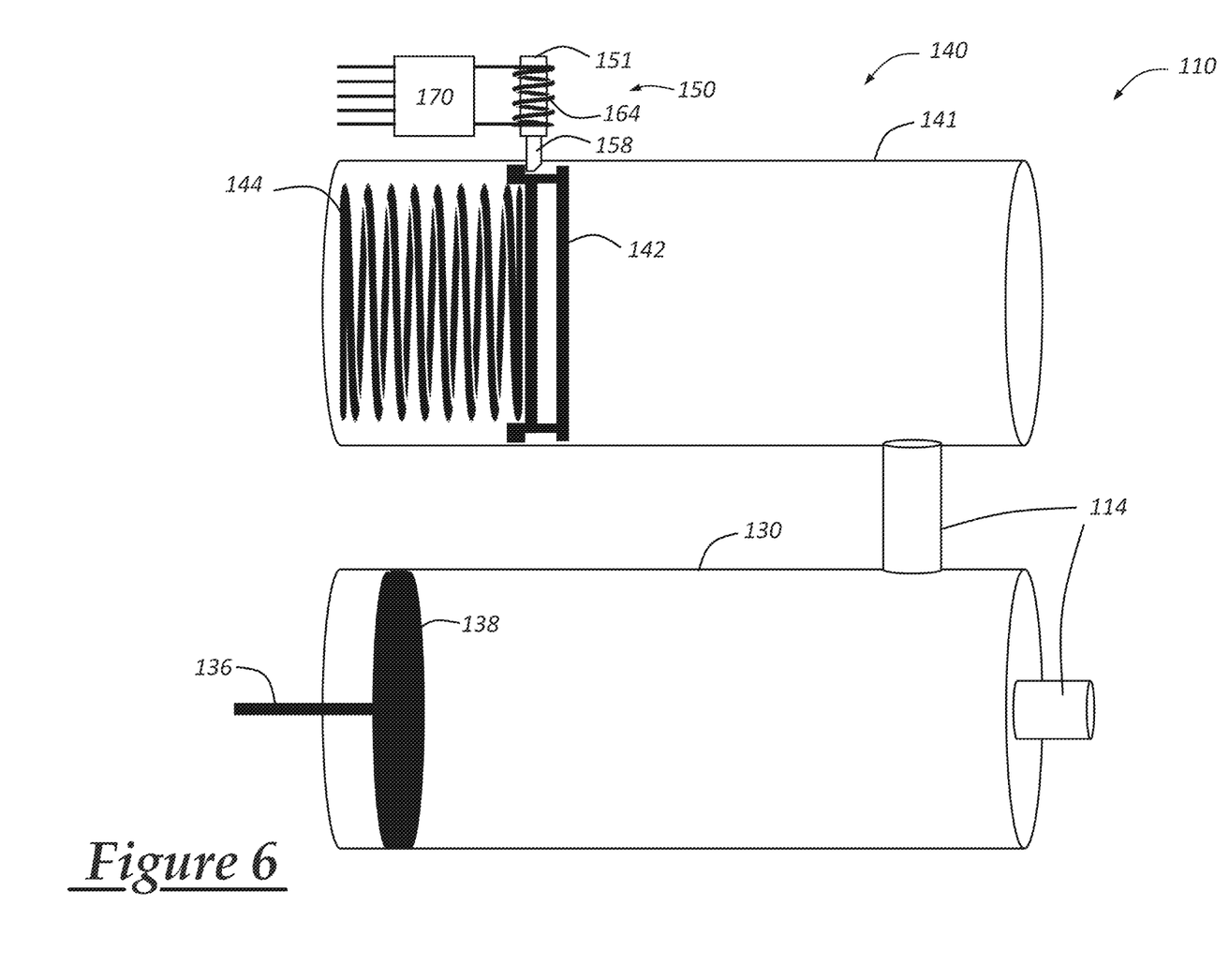
FIG. 6 is a diagrammatic view of portions of a hydraulic clutch system according to a second embodiment of the invention.

The distribution valve 50 is an actuator that selectively connects the different hydraulic components 20, 30, 40 to each other depending upon the desired mode of operation. In the illustrated embodiment, the distribution valve is a solenoid valve having a solenoid-controlled plunger that is moved between three positions to thereby switch the solenoid valve 50 into any of three different states corresponding to three different modes of operation. In other implementations, various other types of actuators may be used for this purpose with fewer or more modes of operation to enable use of the clutch pedal and accumulator to disengage the clutch, and to recharge the accumulator. FIG. 6, discussed below, discloses one such implementation that may be used in some embodiments either in connection with a distribution valve or in a manner that avoids the need for a distribution valve altogether. In other embodiments, the distribution valve 50 need not be a solenoid valve, but may be implemented for example, as a rotating valve (rotary valve), spool valve, or even multiple single state solenoid valves plumed together (i.e., a 5/3 valve).

The distribution valve 50, also referred to as the solenoid valve 50, includes a housing 51 having four ports 52-55 feeding into a cylindrical inner chamber 56, a plunger 58 mounted in the chamber 56 for linear, reciprocal movement between a first, central position shown in FIG. 1, a second, end position shown in FIG. 2, and a third, end position shown in FIG. 3. These first, second, and third positions of the plunger 58 place the distribution valve in respective first, second, and third states corresponding respectively to the first (normal), second (deploy), and third (recharge) modes of operation of the hydraulic clutch system 10. To effect the rewiring or reconfiguration of the hydraulic circuit 12 for the different modes, the plunger 58 includes one or more passageways 60 that are used to interconnect different combinations of the ports 52-55 depending upon which position the plunger is in.

The four ports 52-55 are connected up in the hydraulic circuit 12 as follows. Port 52 connects the distribution valve 50 to the clutch 20; port 53 connects the valve 50 to the hydraulic cylinder 30; and ports 54 and 55 connect the valve 50 to the accumulator 40, with port 54 directly connected to the accumulator 40 and port 55 connected to the accumulator 40 via a check valve 62 that opens when the accumulator 40 is being recharged, but prevents backflow of hydraulic fluid through the check valve 62 from the accumulator.

As shown in FIG. 1, to effect the first (normal) mode of operation, the plunger is held in the first position, which is a central position within the chamber 56 between the second and third end positions. This can be a default position to which the plunger is biased, such as by springs incorporated into the housing on either side of the plunger 58 to hold it in the desired central position. In this first position/first state of the solenoid valve 50, the passageways 60 of the plunger open to the ports 52 and 53 thereby providing fluidic communication between the hydraulic lines 14 that run to the valve 50 from the clutch 20 and hydraulic cylinder 30. Thus, the driver may operate the clutch 20 normally by depressing the clutch pedal 32 to force pressurized hydraulic fluid from the cylinder 30 through the valve 50 and to the clutch 20. This is the normal mode of operation for regular driving of the vehicle.

FIG. 2 depicts the second (deploy) mode of operation which is useful in the event of an automatic emergency braking (AEB) event or for purposes of remote starting of the vehicle when the driver is not present and the vehicle is left in gear with the clutch engaged. In this mode, the plunger 58 is moved to the second position, thereby interconnecting ports 52 and 54 via the passageways 60. This provides fluidic communication between the accumulator 40 and clutch 20 via the hydraulic lines 14 and passageways 60 of the plunger 58. Upon the plunger 58 switching to this second position, pressurized hydraulic fluid from accumulator 40 is free to pass through the solenoid valve 50 and thereby disengage the clutch 20 under the force of the bias provided by the spring 44. This occurs independently of any driver input via the clutch pedal 32. Thus, all that is required to automatically disengage the clutch 20 is movement of the plunger to the second position, and the clutch will remain in this state until the plunger 58 is switched back to the first position which enables the pressure in the line 14 running to the clutch 20 to be relieved back into the system.

FIG. 3 depicts the third (recharge) mode of operation which permits the accumulator to be recharged with pressurized hydraulic fluid following an automatic clutch disengagement from the second mode. This mode is used following the termination of an AEB or remote start event so that the driver may recharge the accumulator 40 in preparation for a subsequent automatic clutch disengagement. In this mode, the plunger 58 is moved to the third position, thereby interconnecting ports 53 and 55 via the passageways 60. This provides fluidic communication between the hydraulic cylinder 30 and accumulator 40 via the hydraulic lines 14 and passageways 60 of the plunger 58. In this mode, a clutch pedal activation by the driver serves to recharge the accumulator 40 with pressurized hydraulic fluid.

It will be appreciated that, in each of the modes described above, the solenoid valve 50 interconnects two of the primary hydraulic components 20, 30, 40, while isolating the third component from the hydraulic circuit 12. Thus, in the first mode, accumulator 40 is isolated from the system; in the second mode, the driver operated hydraulic cylinder 30 is isolated from the system; and in the third mode, the clutch 20 is isolated from the system.

Referring back particularly to FIG. 1, the solenoid valve 50 further includes first and second solenoids 64, 66 that actuate the solenoid valve 50 to move it from its first position to either the second or third position. The solenoids 64, 66 may be integrated into the housing 51 with solenoid 64 located towards one end of the chamber 51 near the second position and the other solenoid 66 located towards the other end of the chamber 51 near the third position. By incorporating a ferromagnetic piece within the plunger, energization of the solenoid 64 can magnetically pull the plunger against the central bias to the second position. Similarly, energization of the solenoid 66 can magnetically pull the plunger against the central bias to the third position. Other implementations of the distribution valve 50 to switch it between the three different operating states will be apparent to those skilled in the art.

The controller 70 is used to operate the two solenoids 64, 66 by providing the appropriate solenoid with an energization signal based on one or more inputs. To switch the plunger 58 from the first position (corresponding to the normal mode of operation) to the second position (corresponding to the automatic clutch deployment mode), a clutch activation signal is provided by the controller which is received by the solenoid valve and, in particular, by the solenoid 64 as electrical energizing energy that creates a magnetic field sufficient to pull the plunger 58 to the second position. This causes the accumulator 40 to discharge its pressurized hydraulic fluid to the clutch 20, thereby disengaging the engine from the transmission.

When used for an AEB event, the clutch activation signal is generated by the controller 70 in response to receiving a clutch disengagement command from a collision avoidance system on the vehicle. This can be received by the controller 70 as one of several inputs 76. In response to receiving the clutch disengagement command, the controller is operable to generate the clutch activation signal when at least the following two conditions exist: the clutch 20 is engaged and the accumulator 40 is charged. These conditions may be verified using sensors on the vehicle. For example, clutch engagement can be determined using a sensor 72 at the clutch. Similarly, accumulator charge can be verified using a sensor 74 that detects the piston 42 in the pressurized position. In another embodiment, the controller 70 may require one or more other conditions to be satisfied before generating the clutch activation signal, such as verifying that the vehicle transmission is in gear, This transmission gear verification can be received from the transmission as one of the other inputs 76.

Once the clutch activation signal has been sent to energize the solenoid 64, the hydraulic clutch system 10 switches into the second (deploy) mode due to movement of the plunger 58 to the second position, thereby disengaging the clutch 20. Following this, the controller 70 then switches the hydraulic clutch system 10 out of the second mode (by deenergizing solenoid 64) and into one or more subsequent modes that permit recharging of the accumulator 40 and operation of the clutch 20 by the driver using the clutch pedal 32. In the embodiment of FIGS. 1-3, this is done by switching to the third (recharge) mode by activating the second solenoid 66 to pull the plunger 58 to the third position so that the driver can recharge the accumulator 40 by depressing the clutch pedal 32, followed by thereafter switching back to the first (normal) mode once the sensor 74 indicates that the accumulator 40 is recharged.

When used for a vehicle remote start event, the operation of the solenoid valve 50, and the hydraulic clutch system 10 in general, may be the same as that described above for an AEB event, except that the clutch disengagement command instead comes from a telematics unit or other remote start module on the vehicle. The particular sequences of operations at the vehicle for handling clutch disengagement for both AEB and remote starting are discussed below in connection with FIGS. 4 and 5.

Following deployment of the accumulator charge of hydraulic fluid that disengages the clutch 20 in the second mode, the controller 70 switches the plunger 58 to the third position as shown in FIG. 3 so that the accumulator 40 can be recharged. This may be done by sending an accumulator recharge signal to the solenoid 66 that energizes it and magnetically pulls the plunger 58 to the third position. This recharge signal may be sent to solenoid 66 immediately upon termination of the clutch activation signal that was being used in the second mode to energize solenoid 64 and hold the plunger 58 in the second position. In this third (recharge) mode, depressing of the clutch pedal 32 by the driver forces hydraulic fluid from the cylinder 30 through the solenoid valve 50, check valve 62, and into the accumulator 40, thereby forcing the piston 42 towards the first end of the accumulator by compression of the spring 44. Then, upon sensing this charged state of the accumulator 40 using the sensor 74, the controller 70 switches the plunger 58 back to the first (normal) position by deenergizing the solenoid 66. This can be done prior to the driver releasing the clutch pedal 32 so that the accumulator 40 is isolated from the hydraulic circuit while the still being pressurized.

Figure 4:
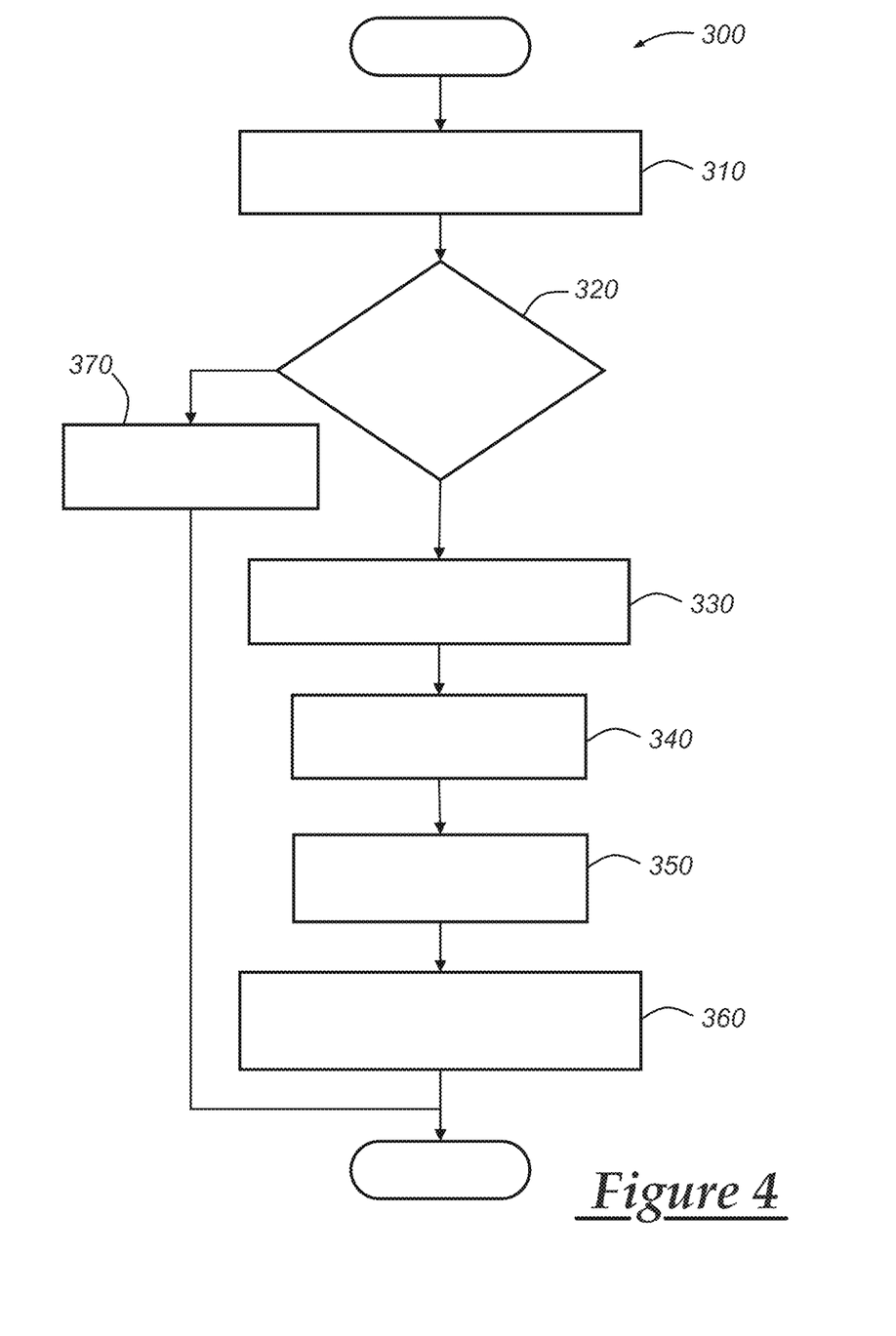
FIG. 4 is a flowchart showing operation of the hydraulic clutch system of FIG. 1 during an automatic emergency braking event.

Referring now to FIG. 4, there is shown a method 300 of operating a hydraulic clutch system, such as hydraulic clutch system 10, during an AEB event. The method starts when a collision avoidance system on the vehicle detects an event that requires the vehicle to reduce speed, such as a potential collision with an obstacle. In response to detecting this event, a determination is made at step 320 as to whether the vehicle is in the proper state for automatic clutch disengagement. This determination can be initiated, for example, by the controller 70 receiving the clutch disengagement command from the collision avoidance system. At step 320, the determination of proper vehicle state may be based on one or more hydraulic clutch system state indicators. For example, this may include determining that both of the following conditions exist: the clutch is engaged and the accumulator is charged. In some embodiments, the determination of proper vehicle state may also include one or more other conditions, such as determining that the vehicle transmission is in gear. These vehicle state determinations can be made by controller 70 as described above, and different or additional threshold requirements for automatic clutch disengagement can be determined if necessary or desirable.

If any of the condition checks at step 320 fail, then the automatic clutch disengagement is not carried out, and the method moves to step 370 where a notification can be sent either to a memory storage on the vehicle for later reporting or diagnosis, and/or to the driver via a driver display or otherwise. If the proper vehicle state is confirmed, then the method moves to block 330 where the vehicle deploys the automatic clutch disengagement which, for the hydraulic clutch system 10, involves switching the solenoid valve 50 to the second state in which the plunger 58 is moved to the second position. This results in the clutch 20 being disengaged independently of any driver input on the clutch pedal. The vehicle then slows or stops at step 340 and this may be done at least in part by applying direct braking of the wheels. Once this AEB event concludes, the solenoid valve 50 is switched to the third state, corresponding to the recharge mode, to thereby permit recharging of the accumulator 40. Then, at step 350, the driver may depress the clutch pedal 32 to recharge the accumulator 40. Finally, at step 360, in response to detecting successful recharge of the accumulator 40, the solenoid valve 50 is returned to the first state so that the driver can resume operating the clutch normally.

Figure 5:
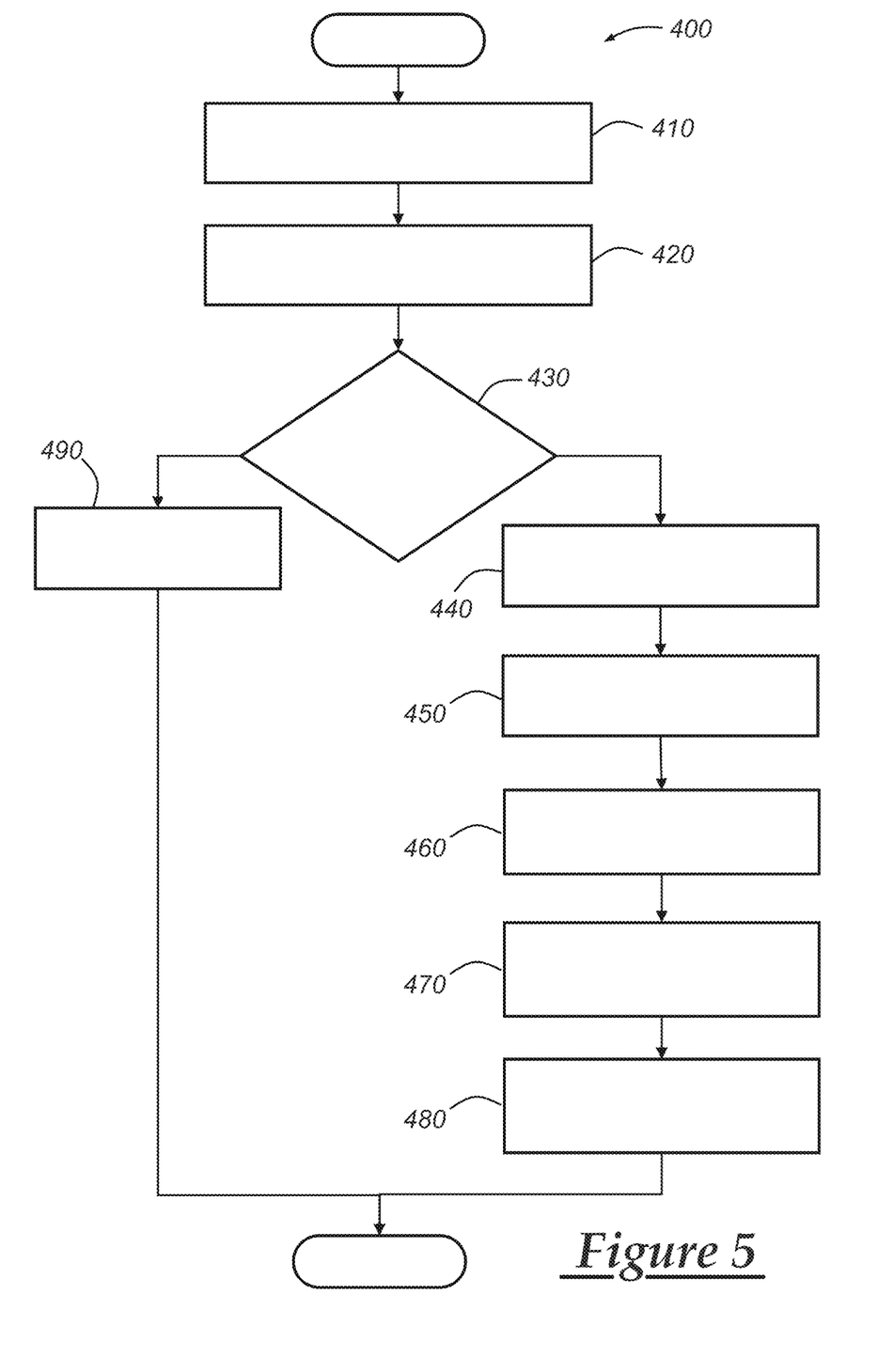
FIG. 5 is a flowchart showing operation of the hydraulic clutch system of FIG. 1 during a remote start event.

FIG. 5 depicts a method 400 of operating a hydraulic clutch system, such as hydraulic clutch system 10, during a vehicle remote starting event. The method begins at step 410 when the vehicle receives a remote start command. The vehicle then carries out an electronically-controlled setting or setting confirmation of a vehicle brake, such as a parking brake. These steps 410 and 420 may be carried out conventionally as is already known to those skilled in the art. Then, at step 430, a determination is made as to whether the vehicle is in the proper state for automatic clutch disengagement. The determination of proper vehicle state may be based on one or more hydraulic clutch system state indicators. For example, this may include determining that both of the following conditions exist: the clutch is engaged and the accumulator is charged. In some embodiments, the determination of proper vehicle state may also include one or more other conditions, such as determining that the vehicle transmission is in gear. These vehicle state determinations can be made by controller 70 as described above, and different or additional threshold requirements for automatic clutch disengagement can be determined if necessary or desirable.

If any of the condition checks at step 430 fail, then the automatic clutch disengagement is not carried out, and the method moves to block 490 where a notification can be sent either to a memory storage on the vehicle for later reporting or diagnosis, and/or to the driver via a remote software app or other interface from which the remote starting command was originally sent. If the proper vehicle state is confirmed, then the method moves to block 440 where the vehicle deploys the automatic clutch disengagement which, for the hydraulic clutch system 10, involves switching the solenoid valve 50 to the second state in which the plunger 58 is moved to the second position. This results in the clutch 20 being disengaged independently of any driver input on the clutch pedal. Once the clutch 20 is disengaged, as can be confirmed by sensor 72, the vehicle engine is started at step 450. The solenoid valve 50 can then be placed into the third state by moving the plunger 58 to the third position, with the clutch 20 being held in the disengaged state as described above. Once the driver subsequently arrives at and enters the vehicle, s/he can depress the clutch pedal 32 at step 470 which, since the hydraulic clutch system 10 is in the third mode, recharges the accumulator 40. Finally, at step 480, in response to detecting successful recharge of the accumulator 40, the solenoid valve 50 is returned to the first state so that the driver can resume operating the clutch normally.

FIG. 6 depicts an alternative embodiment of portions of a hydraulic clutch system 110 in which the functions of the accumulator and distribution valve have essentially been combined together. In FIG. 6, components of the system 110 that are not shown may be implemented as shown in FIGS. 1-3, and components that are shown and that correspond to similar or identical ones from the hydraulic clutch system 10 of FIGS. 1-3 are identified using the same numerals incremented by 100.

The system 110 includes a (master) hydraulic cylinder 130 operated by the driver via a clutch pedal that drives a push rod 136 into the cylinder, thereby moving a piston 138 that forces hydraulic fluid from the cylinder under pressure. Under normal operation, this fluid exits through one of the hydraulic lines 114 that leads directly to the clutch to thereby disengage the engine from the transmission. The hydraulic cylinder 130 is also connected by a hydraulic line 114 to an accumulator 140 that holds a charge of hydraulic fluid for use in automatic clutch disengagement. The accumulator 140 comprises a hydraulic cylinder 141 that includes a piston 142 and spring 144 that is located at a first end of the cylinder and biases the piston towards a second end. Thus, the piston 142 moves between positions adjacent first and second ends of the hydraulic cylinder 141.

In this embodiment, the actuator is not a distribution valve, but a solenoid-operated latch that serves to retain the piston 142 in a position between the first and second ends of the cylinder 141 at a location near the first end of the cylinder 141 with the spring 144 in a compressed state. As with accumulator 40, the spring constant of spring 144 is sufficient such that, when in this compressed state, the spring provides enough force when released to overcome the spring force in the clutch to thereby disengage it.

The actuator 150 includes a housing 151 having a solenoid 164 and plunger 158 that moves between the first and second positions. The first position corresponds to an extended position in which the plunger 158 protrudes from the housing, as shown in FIG. 6, and the second position corresponds to a retracted position in which the plunger 158 is retracted at least partially into the housing 151. In the embodiment shown, the plunger 158 is biased into the first, extended position, and this can be done, for example, using a spring within the housing 151. The plunger contains a ferromagnetic material such that, upon energization of the solenoid 164, the plunger is pulled into the housing 151 to the second, retracted position by magnetic attraction. The solenoid 164 may be operated by a controller 170 using the same inputs and methodology discussed above in connection with FIGS. 1-5.

The actuator 150 is located at a position between the first and second ends of the cylinder 141 such that, when the plunger 158 is in its extended position, it interferes with movement of the piston 142 towards the second end such that the accumulator 140 holds the charge of hydraulic fluid. The accumulator then discharges the charge of hydraulic fluid when the plunger 158 is moved to the retracted position by energization of the solenoid 164 to thereby free the piston 142 to move towards the second end under force of the bias provided by spring 144. The pressurized hydraulic fluid discharged from the accumulator flows through lines 114 to the master cylinder 130 and from there to the clutch to disengage it without any driver input via the clutch pedal.

The accumulator 140 may then be recharged by a subsequent clutch pedal depress from the driver which forces hydraulic fluid into the accumulator 140, forcing the piston 142 towards the first end of the cylinder 141 until it passes by the plunger 158. For this purpose, the plunger 158 may have a ramped surface, as shown, facing the second end of the cylinder 141, such that the piston 142 causes the plunger 158 to move up towards its retracted position as the piston 142 moves by. The backside of the plunger 158 has a flat surface that interferes with a corresponding surface on the piston to thereby retain it in place under the force of the biasing spring 144.

As will be understood by those skilled in the art, to avoid overstroking the clutch during recharge, the clutch may be implemented using a separate throw-out bearing and yoke that is travel limited. The hydraulic clutch system 110 may also include a valve (spring/ball, reed, check, or electronic) to block the surge of hydraulic fluid exiting the accumulator 140 during discharge from reaching the hydraulic fluid reservoir used in a typical system.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A hydraulic clutch system having electronically-actuated automatic clutch disengagement for use in a manual transmission vehicle, comprising:
   a hydraulic cylinder having a supply of hydraulic fluid therein;
   a clutch pedal operatively connected to the hydraulic cylinder so as to force at least some of the hydraulic fluid out of the hydraulic cylinder and thereby pressurize the hydraulic fluid when the clutch pedal is depressed;
   an accumulator storing a charge of the hydraulic fluid and operable to force at least some of the hydraulic fluid out of the accumulator and thereby pressurize the hydraulic fluid;
   a clutch that, when engaged, couples an engine of the vehicle to a transmission of the vehicle, wherein the clutch disengages the engine from the transmission in response to receiving the pressurized hydraulic fluid from either the hydraulic cylinder or the accumulator, thereby preventing motive power from the engine to be transferred to the transmission;
   an actuator having at least a first position and a second position corresponding to respective first and second modes of operation of the hydraulic clutch system; and
   a controller electrically connected to the actuator to switch the actuator from the first position to the second position;
   wherein, when the actuator is in the first position, the hydraulic clutch system is operable in a first mode in which the clutch may be operated by a driver of the manual transmission vehicle using the clutch pedal, and when the actuator is in the second position, the hydraulic clutch system is operable in a second mode in which the clutch is disengaged by the pressurized hydraulic fluid from the accumulator independently of any driver input to the clutch pedal,
   wherein the actuator switches from the first position to the second position in response to a clutch activation signal received by the actuator from the controller so as to cause the hydraulic clutch system to switch to the second mode in which the clutch is disengaged by the pressurized hydraulic fluid from the accumulator, and wherein the controller is operable, in response to receiving a clutch disengagement command, to generate the clutch activation signal when at least the following two conditions exist: the clutch is engaged and the accumulator is charged, and
   wherein the clutch disengagement command is received as part of a remote start event that involves, prior to receipt of the clutch disengagement command, an electronically-controlled setting or setting confirmation of a vehicle brake, and that involves, after generation of the clutch activation signal and disengagement of the clutch by the pressurized hydraulic fluid from the accumulator, starting the engine and operating the controller to switch the hydraulic clutch system out of the second mode and into one or more subsequent modes that permit recharging of the accumulator and operation of the clutch by the driver using the clutch pedal.

2. The hydraulic clutch system defined in claim 1, wherein the clutch disengagement command is received as part of an automatic emergency braking event and wherein, following generation of the clutch activation signal and disengagement of the clutch by the pressurized hydraulic fluid from the accumulator, the controller operates to switch the hydraulic clutch system out of the second mode and into one or more subsequent modes that permit recharging of the accumulator and operation of the clutch by the driver using the clutch pedal.

3. The hydraulic clutch system defined in claim 1, wherein the actuator comprises a solenoid valve interconnected between the hydraulic cylinder, accumulator, and clutch so as to selectively route the hydraulic fluid among the hydraulic cylinder, accumulator, and clutch, and wherein the solenoid valve has a plunger that moves between different positions within the solenoid valve, the solenoid valve further comprising at least one solenoid that, when energized, causes the plunger to move between at least two of the positions so as to switch the hydraulic clutch system between the first and second modes of operation.

4. The hydraulic clutch system defined in claim 3, wherein the solenoid valve includes a plurality of input ports, at least one of each of which is connected to the hydraulic cylinder, accumulator, and clutch so as to provide fluidic communication of the hydraulic fluid between the solenoid valve and the hydraulic cylinder, accumulator, and clutch, and wherein the plunger includes one or more passageways that selectively connect different combinations of the ports together depending on at which of the at least two positions the plunger is located.

5. The hydraulic clutch system defined in claim 3, further comprising a third mode of operation, wherein, when the hydraulic clutch system is in the first mode, the plunger is at a first one of the positions in which the hydraulic cylinder is in fluidic communication with the clutch, when the hydraulic clutch system is in the second mode, the plunger is at a second one of the positions in which the accumulator is in fluidic communication with the clutch, and when the hydraulic clutch system is in the third mode, the plunger is at a third one of the positions in which the hydraulic cylinder is in fluidic communication with the accumulator such that the accumulator can be recharged with pressurized hydraulic fluid by the driver depressing the clutch pedal.

6. The hydraulic clutch system defined in claim 1, wherein the actuator comprises a housing having a solenoid and plunger that moves between the first and second positions, wherein the first position corresponds to an extended position in which the plunger protrudes from the housing, and the second position corresponds to a retracted position in which the plunger is retracted at least partially into the housing, wherein the plunger is biased into the first position and moves from the first position to the second position in response to energization of the solenoid.

7. The hydraulic clutch system defined in claim 6, wherein the accumulator comprises a second hydraulic cylinder having a piston that moves between positions adjacent first and second ends of the second hydraulic cylinder, wherein the piston is biased towards the second end, and wherein the plunger is disposed between the first and second ends at a location that, when in its extended position, interferes with movement of the piston towards the second end such that the accumulator holds the charge of hydraulic fluid when the plunger is in the extended position and discharges the charge of hydraulic fluid out of the accumulator when the plunger is moved to the retracted position by energization of the solenoid to thereby free the piston to move towards the second end under force of the bias on the piston.

8. A hydraulic clutch system having electronically-actuated automatic clutch disengagement for use in a manual transmission vehicle, comprising: a hydraulic cylinder having a supply of hydraulic fluid therein;
  a clutch pedal operatively connected to the hydraulic cylinder so as to force at least some of the hydraulic fluid out of the hydraulic cylinder and thereby pressurize the hydraulic fluid when the clutch pedal is depressed;
  an accumulator storing a charge of the hydraulic fluid and having a piston biased so as to force at least some of the hydraulic fluid out of the accumulator and thereby pressurize the hydraulic fluid;
  a clutch that couples an engine of the vehicle to a transmission of the vehicle and that disengages the engine from the transmission in response to receiving the pressurized hydraulic fluid from either the hydraulic cylinder or the accumulator;
  a distribution valve interconnected between the hydraulic cylinder, accumulator, and clutch so as to selectively route the hydraulic fluid among the hydraulic cylinder, accumulator, and clutch;
  wherein the distribution valve is electronically operated to switch between a first state in which the hydraulic cylinder is in fluidic communication through the distribution valve with the clutch, a second state in which the accumulator is in fluidic communication with the clutch, and a third state in which the hydraulic cylinder is in fluidic communication with the accumulator;
  wherein, when the distribution valve is in the first state, the hydraulic clutch system is operable in a first mode in which the clutch may be operated by a driver of the manual transmission vehicle using the clutch pedal, and when the distribution valve is in the second state, the hydraulic clutch system is operable in a second mode in which the clutch is disengaged by the pressurized hydraulic fluid from the accumulator independently of any driver input to the clutch pedal, and when the distribution valve is in the third state, the hydraulic clutch system is operable in a third mode in which depressing the clutch pedal by the driver recharges the accumulator with pressurized hydraulic fluid.

9. The hydraulic clutch system defined in claim 8, wherein the distribution valve comprises a solenoid valve that includes a plurality of input ports, at least one of each of which is connected to the hydraulic cylinder, accumulator, and clutch so as to provide fluidic communication of the hydraulic fluid between the solenoid valve and hydraulic cylinder, accumulator, and clutch, and wherein the solenoid valve has a plunger that moves linearly within the solenoid valve between first, second, and third positions corresponding to the respective first, second, and third states, the plunger including one or more passageways that selectively connect different combinations of the ports together depending on whether the plunger is located at the first, second, or third position.

10. The hydraulic clutch system defined in claim 9, wherein the first position is located between the second and third positions and wherein the plunger is biased into the first position.

11. The hydraulic clutch system defined in claim 9, wherein the solenoid valve has two of the ports connected to the accumulator, with one port directly connected to the accumulator so as to receive pressurized hydraulic fluid to disengage the clutch when the solenoid valve is in the second state, and the other port connected to the accumulator via a check valve that opens when the accumulator is recharged while the solenoid valve is in the third state and that prevents backflow of hydraulic fluid through the check valve from the accumulator.

12. The hydraulic clutch system defined in claim 8, further comprising a controller, wherein the distribution valve switches from the first position to the second position in response to a clutch activation signal received by the distribution valve from the controller so as to cause the hydraulic clutch system to switch to the second mode in which the clutch is disengaged by the pressurized hydraulic fluid from the accumulator, and wherein the controller is operable, in response to receiving a clutch disengagement command, to generate the clutch activation signal when at least the following two conditions exist: the clutch is engaged and the accumulator is charged.

13. The hydraulic clutch system defined in claim 12, wherein the distribution valve switches from the second position to the third position in response to an accumulator recharge signal received by the distribution valve from the controller so as to cause the hydraulic clutch system to switch to the third mode in which the accumulator is recharged with the pressurized hydraulic fluid provided by the hydraulic cylinder in response to the driver depressing the clutch pedal.

14. The hydraulic clutch system defined in claim 12, wherein the clutch disengagement command is received as part of an automatic emergency braking event and wherein, following generation of the clutch activation signal and disengagement of the clutch by the pressurized hydraulic fluid from the accumulator, the controller operates to switch the hydraulic clutch system out of the second mode and into the third mode so as to permit recharging of the accumulator and operation of the clutch by the driver using the clutch pedal.

15. The hydraulic clutch system defined in claim 12, wherein the clutch disengagement command is received as part of a remote start event that involves, prior to receipt of the clutch disengagement command, an electronically-controlled setting or setting confirmation of a vehicle brake, and that involves, after generation of the clutch activation signal and disengagement of the clutch by the pressurized hydraulic fluid from the accumulator, starting the engine and operating the controller to switch the hydraulic clutch system out of the second mode and into the third mode so as to permit recharging of the accumulator and operation of the clutch by the driver using the clutch pedal.

16. A method of automatic clutch disengagement for use in a manual transmission vehicle, wherein the method is carried out by a vehicle having an engine, a manual transmission, and a hydraulic clutch system that includes a clutch connected between the engine and the transmission and a clutch pedal that can be manually depressed by a vehicle driver to disengage the clutch, the method comprising the steps of:
 receiving a remote start command and setting or confirming setting of an electronic brake on the vehicle;
 receiving a clutch disengagement command at a clutch system controller;
 determining, based on one or more hydraulic clutch system state indicators, that the hydraulic clutch system is in a proper state for clutch disengagement;
 disengaging the clutch using pressurized hydraulic fluid supplied by an accumulator of the hydraulic clutch system independently of any driver input on the clutch pedal; and
 starting the engine and thereafter recharging the accumulator with hydraulic fluid pressurized by the driver using the clutch pedal.

17. The method of claim 16,
 wherein the method provides automatic emergency braking that includes, prior to the receiving step, detecting an event that requires the vehicle to reduce speed, and wherein the method further comprises, after the disengaging step, causing or allowing the vehicle to slow, and recharging the accumulator with hydraulic fluid pressurized by the driver using the clutch pedal.

* * * * *